United States Patent [11] 3,620,902

[72] Inventors George J. Anderson
　　Wilbraham;
　　Ronald H. Dahms, Springfield, both of Mass.
[21] Appl. No. 738,798
[22] Filed June 21, 1968
[45] Patented Nov. 16, 1971
[73] Assignee Monsanto Company
　　St. Louis, Mo.
　　Continuation-in-part of application Ser. No. 588,310, Oct. 21, 1966, now abandoned, and a continuation-in-part of 605,531, Dec. 29, 1966, now abandoned, and a continuation-in-part of 676,062, Oct. 18, 1967, now abandoned, and a continuation-in-part of 676,039, Oct. 18, 1967, now abandoned, and a continuation-in-part of 676,043, Oct. 18, 1967, now abandoned. This application June 21, 1968, Ser. No. 738,798

[54] LAMINATES PREPARED FROM $C_8-C_{13}$ SUBSTITUTED PHENOL-FORMALDEHYDE RESINS
5 Claims, No Drawings

[52] U.S. Cl. ................................................... 161/165,
　　156/335, 161/259, 260/29.3, 260/51 R, 260/53 R
[51] Int. Cl. .................................................... B32b 27/42,
　　C08g 5/08
[50] Field of Search ............................................ 161/165,
　　259, 249; 156/335; 260/19 N, 57

[56] References Cited
UNITED STATES PATENTS

| | | | |
|---|---|---|---|
| 3,429,762 | 2/1969 | Nakagawa et al. | 161/259 X |
| 3,248,276 | 4/1966 | Bean, Jr. et al. | 161/259 X |
| 3,013,916 | 12/1961 | Boiney et al. | 161/259 |
| 2,827,946 | 3/1958 | Christenson et al. | 161/249 X |
| 2,163,637 | 6/1939 | Thomas | 260/19 N |
| 3,448,001 | 6/1969 | Jarvi | 260/57 |
| 2,388,583 | 11/1945 | Ward | 260/619 |
| 2,423,415 | 7/1947 | Soday | 260/619 |
| 2,824,860 | 2/1958 | Aldridge et al. | 260/82 |
| 3,420,915 | 1/1969 | Braithwaite | 260/62 X |

Primary Examiner—Howard E. Schain
Attorneys—John W. Klooster, Arthur E. Hoffman and H. B. Roberts ABSTRACT: Laminates made from phenolic resin impregnated cellulosic substrates. The phenolic resin used is made from a substituted phenol and formaldehyde. The substituted phenol is made by reacting a specific $C_8$ through $C_{13}$ mixture of carbocyclic compounds. The product laminates have an improved combination of water absorption, solvent-resistance, heat-resistance, electrical properties, and physical properties.

LAMINATES PREPARED FROM $C_8$-$C_{13}$ SUBSTITUTED PHENOL-FORMALDEHYDE RESINS

RELATED APPLICATIONS

This application is a continuation-in-part of our copending U.S. applications, Ser. No. 588,310, filed Oct. 21, 1966 now abandoned; Ser. No. 605,531, filed Dec. 29, 1966 now abandoned; Ser. No. 676,062 filed Oct. 18, 1967 now abandoned, Ser. No. 676,039 filed Oct. 18, 1967 now abandoned, and Ser. No. 676,043 filed Oct. 18, 1967 now abandoned.

BACKGROUND

In the art of making phenolic laminates using cellulosic substrate members in a sheetlike form, it has long been appreciated that phenol-formaldehyde resins tend to make laminates which, when impregnated with sufficient such resin to have acceptable strength, have relatively poor water absorption, electrical properties, solvent resistance heat resistance and physical properties. Unless there is a careful balance of properties in such a product, the laminate is of low quality at best.

There has now been discovered a new and very useful class of laminates made from phenolic resin impregnated cellulosic substrates in which the impregnating resin is a certain substituted phenol-formaldehyde resole resin. Depending upon the type of cellulosic substrate employed, and upon the amount and particular type of such substituted phenol-formaldehyde resin employed, the product thermoset laminates characteristically have an improved combination or balance of properties, including physical properties, water absorption, electrical properties, solvent resistance and heat resistance.

SUMMARY

This invention is directed to new and very useful laminates. These laminates employ a plurality of integral cellulosic substrate members in sheetlike form arranged face to face in deck fashion. Each such substrate member is impregnated with a thermoset substituted phenol-formaldehyde resole resin, and each such member is bonded to its adjacent member by such thermoset resin in a generally continuous manner in face-to-face engagement.

The phenol-formaldehyde resole resin employed in the products of this invention has a formaldehyde to phenol mol ratio of from about 0.8 to 2.0 (preferably from about 0.9 to 1.5), and is produced by reacting in the presence of a basic (preferably organic) catalyst under liquid aqueous phase conditions a certain substituted phenol mixture with formaldehyde. The resole resin used in this invention further has a relatively high molecular weight as shown by the fact that it is substantially water insoluble but has a methanol solubility such that a 60 weight percent solution thereof can be prepared in methanol. Such methanol solution characteristically has a viscosity not greater than about 5,000 centipoises, and preferably in the range from about 50 to 500 centipoises. In addition, this resin has a free formaldehyde content which is less than about 5 weight percent.

The substituted phenol mixture used to make such resin is itself prepared by reacting phenol under Friedel-Crafts conditions with a controlled mixture of carbocyclic compounds. The mixture of carbocyclic compounds comprises (on a 100 weight percent basis when in a form substantially free of other materials):

A. from about 10 through 40 weight percent of compounds each molecule of which has:
  1. the indene nucleus,
  2. from nine through 13 atoms,
  3. as nuclear substituents from zero through four methyl groups, B. from about 5 through 70 weight percent of compounds each molecule of which has:
  1. the dicyclopentadiene nucleus,
  2. from about 10 through 13 carbon atoms,
  3. as nuclear substituents from zero through three methyl groups, C. from about 15 through 65 weight percent of compounds each molecule of which has:
  1. a phenyl group substituted by a vinylidene group,
  2. from about eight through 13 carbon atoms,
  3. as substituents from zero through three groups selected from the class consisting of methyl and ethyl, D. from about 0 through 5 weight percent divinyl benzene, E. provided that the sum total of all such compounds in any given mixture of carbocyclic compounds is always 100 weight percent.

At the time when such controlled mixture of carbocyclic compounds is reacted with phenol as indicated, there can be present in such mixture as diluents inert (i.e., as respects reactivity towards phenol under Friedel-Crafts reaction conditions) organic compounds such as aromatic and aliphatic hydrocarbons. Thus, there is present, conveniently, at least about 25 weight percent of diluent in such total combination of mixture of carbocyclic compounds and diluent, although this value is variable depending upon reactants and reaction conditions. While there is no apparent upper limit on the amount of diluent which may be present, it is preferred that the amount of diluent present be not greater than about 95 weight percent (same basis). Preferably, the amount of diluent ranges from about 15 to 70 weight percent (same basis). Up to about 10 weight percent (same basis) of water can be present, but it is preferred to use substantially anhydrous conditions.

Carbocyclic compound mixtures useful in this invention are available commercially from various petroleum producers under a variety of trade names. For example, one suitable carbocyclic compound mixture is available from Enjay Chemical Company under the trade designation "Heart Cut LPD." Another suitable such mixture is available from Monsanto Company, St. Louis, Missouri, under the trade designation "Resin Oil." Still another such mixture is available from the Gulf Oil Company under the trade designation "Resin Former Feed Stock." A presently preferred such mixture is the Monsanto Company "Resin Oil" which is a $C_8$ to $C_{13}$ product cut with a boiling range of from about 300° to 425° F. (150° to about 220° C.) and contains the indicated carbocyclic compound mixture. Shown below in table 1 is a breakdown such as is made by vapor phase chromatography showing the composition of these three carbocyclic compound mixtures:

TABLE I

|  | Gulf Oil [1] | Monsanto [2] | Enjay [3] |
|---|---|---|---|
| Vinylidene aromatics: | | | |
| Styrene $C_8$ | 7.6 | 1.4 | 10.1 |
| Alpha-methylstyrene $C_9$ | 1.6 | 2.8 | 2.2 |
| Beta-methylstyrene $C_9$ | 1.5 | 1.6 | 2.1 |
| Vinyltoluene $C_9$ | 4.5 | 17.4 | 10.5 |
| $C_2$ alkylstyrene [4] $C_{10}$ | 0.9 | 6.2 | 5.8 |
| Divinylbenzene $C_{10}$ | 0.3 | 1.3 | 1.6 |
| Indenes: | | | |
| Indene $C_9$ | 12.7 | 17.6 | 12.7 |
| Methylindene $C_{10}$ | 0.3 | 5.5 | 7.6 |
| Cyclopentadienes: | | | |
| Isoprene-cyclopentadiene $C_{10}$ | 0.6 | 0.3 | |
| Dicyclopentadiene $C_{10}$ | 42.7 | 13.9 | 1.1 |
| Methylcyclopentadiene $C_{11}$ | 12.4 | 4.6 | 2.1 |
| Alkyl aromatics: | | | |
| Benzene $C_6$ | 0.5 | | 0.1 |
| Toluene $C_7$ | 3.9 | | 0.8 |
| $C_2$ Alkylbenzene $C_8$ | 7.4 | 0.4 | 12.1 |
| $C_3$ Alkylbenzene $C_9$ | 1.2 | 19.2 | 22.2 |
| $C_4$ Alkylbenzene $C_{10}$ | | 4.1 | 6.3 |
| Naphthalenes, Naphthalene $C_{14}$ | 0.2 | 3.2 | 2.2 |
| Unidentified (aliphatics) | 2.1 | | |
| Total carbocyclic compound mixture content | 84.8 | 72.6 | 55.9 |
| ASTM boil range, ° F. (ASTM D-86): | | | |
| Initial boiling point | 283 | 315 | 307 |
| 10% | 318 | 333 | 320 |
| 50% | 329 | 343 | 342 |
| 90% | 348 | 367 | 401 |
| End point | 364 | 402 | 411 |
| Residue | 1.0 | | |
| Specific gravity | 0.952 | 0.933 | 0.909 |

[1] Available commercially from the Gulf Oil Co. as "Resin Foremer Feed Stock."
[2] Available commercially from the Monsanto Company under the trade designation "Resin Oil."
[3] Available commercially from Enjay Company under the trade designation "Heart Cut LPD."
[4] This styrene compound is selected from the group consisting of ethylstyrene and dimethylstyrene.

By the term "dicyclopentadiene" reference is had to a molecule having the structure:

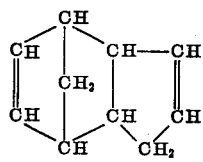

By the phrase "when in a form substantially free of other materials," reference is had to a mixture (e.g., of starting materials, of products, or the like, as the case may be) which is substantially free (e.g., on an analytical or a theoretical basis) of substances (like inerts) other than such mixture itself. For example, in table I above, the carbocyclic compound mixtures are composed of indenes, vinylidene aromatics, and dicyclopentadienes as well as inert diluents, such as "alkyl aromatics," "naphthalenes," and "unidentified aliphatics," but each contains a combination (on a 100 weight percent basis in a form substantially free of other materials) of components (indenes, dicyclopentadiene, and vinylidene aromatics) as described above.

In this invention, all solids are conveniently measured using the ASTM Test Procedure D–115–55.

Also, in such a preferred embodiment, the substituted phenol used in making phenolic resin is made using a carbocyclic compound mixture in which there are from about 20 through 40 weight percent of compounds having the indene nucleus (as above described), from about 15 through 30 weight percent of compounds having the dicyclopentadiene nucleus (as above described) and from about 30 through 65 weight percent of compounds having a phenyl group and a vinylidene group as above described, the percentage of divinyl benzene in such preferred carbocyclic compound mixture being as described above. In any such more preferred carbocyclic compound mixture, there are a total of 100 weight percent of these three components.

The term "vinylidene" as used herein has generic reference both to vinylidene radicals (CH$_2$=C<), and vinyl radicals (CH$_2$=CH– or –CH=CH–); observe that in carbocyclic compound mixtures used in this invention having a phenyl group substituted by a vinylidene group, alpha-methyl substitution is included in this definition, as well as styrene, methyl styrene, and ethyl styrene.

To react phenol with such an aforedescribed carbocyclic compound mixture, it is convenient to use Friedel-Crafts conditions, as indicated.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent acid catalyst in the presence of appropriate heat and pressure. Conveniently, the phenol and suitable Friedel-Crafts acid catalyst are mixed, brought to the proper temperature and the carbocyclic compound mixture metered into the acidified (or catalyzed) phenol.

For purposes of this invention, the reaction of carbocyclic compound mixture with phenol is preferably carried out at temperatures in the range of from about 25° to 200° C., although higher and lower temperatures can be used. Also, the reaction is preferably conducted under liquid phase conditions at or below atmospheric pressures although superatmospheric pressures can be used. Inert hydrocarbons, as indicated above, generally facilitate the process. Such inert hydrocarbons can be readily removed, such as by vacuum stripping, at the completion of the reaction if desired. Especially when stripping is contemplated, the most preferred inert hydrocarbons have boiling points between about 70° and 140° C. The progress of the reaction can be monitored, if desired, by measuring the quantity remaining of unreacted carbocyclic compound mixture using, for example, vapor phase chromatography.

Friedel-Crafts catalysts which may be used in place of aluminum chloride, or together with aluminum chloride, include:

A. other inorganic halides, such as gallium, titanium, antimony and zinc halides, (including $ZnCl_2$);
B. inorganic acids such as sulfuric, phosphoric and the hydrogen halides (including HF);
C. activated clays such as silica gel and alumina;
D. $BF_3$ and $BF_3$ organic complexes, such as complexes of $BF_3$ with organic compounds, such as ethanol, butanol, glycol, phenol, cresol, anisole, ethyl ether, isopropyl ether, di-n-butyl ether, formic acid, acetic acid, propionic acid and the like, or with inorganic acids, such as phosphoric acid, sulfuric acid, and the like, and
E. alkyl, aryl and aralkyl sulfonic acids, such as ethane-sulfonic acid, benzene sulfonic acid, benzene disulfonic acid, chlorobenzene sulfonic acid, 3,4-dichlorobenzene sulfonic acid, cresol sulfonic acids, phenol sulfonic acids, toluene sulfonic acids, xylene sulfonic acids, octylphenol sulfonic acid, B-naphthalene sulfonic acid, 1-naphthol-4-sulfonic acid, and the like.

When $BF_3$, as such, is employed, it is conveniently fed to a reaction mixture in gaseous form.

While any combination of carbocyclic compound starting mixture, phenol and catalyst can be used, it is particularly convenient to react in the presence of less than about 10 weight percent (based on the phenol) of acid catalyst.

The reaction mass is heated to a temperature in the range of from about 25° to 200° C. The rate of this reaction is dependent, to some degree, on the temperature employed. In general, the reaction is rapid, and a complete reaction between phenol and carbocyclic compound mixture is preferred. Generally, a heating time of from about 10 minutes to 4 hours is employed. The various process variables are summarized in table II below.

TABLE II

| Process variable | Broad range | Preferred range |
|---|---|---|
| Temperature | About 25 to 200° C. | About 40 to 125° C. |
| Reaction time | Less than about 4 hrs. | About 10 to 30 min. |
| Catalyst (based on phenol) | Less than about 10 weight percent. | About 0.1 to 1.0 weight pe4cent. |
| Inert hydrocarbon diluent (based on total weight carbocyclic mixture and diluent). | Up to about 75 weight percent. | About 20 to 35 weight percent. |
| Total carbocyclic mixture [1] (based on 100 parts by weight phenol). | About 10 to 80 parts by weight. | About 40 to 60 parts by weight. |

[1] On a 100 weight percent basis when in a form sustantially free of other materials.

The properties of a given so-substituted phenol product are affected by the process conditions used to make that product (e.g., molecular weight distribution, color and the like). The resulting reaction product is, as those skilled in the art will appreciate, a complex mixture of various different substituted phenols produced from the reaction of phenol under Friedel-Crafts conditions with the carbocyclic compound starting mixture to produce phenol molecules which are substituted both on ring carbon atoms and on phenol hydroxyl oxygen atoms by moieties derived from such carbocyclic compound.

A substituted carbocyclic compound phenol product can be prepared in a form substantially free of starting materials by conventional distillation separation techniques (e.g., steam distillation, vacuum stripping, and the like), as those skilled in the art will appreciate, but in making resoles for use in this invention, such product can be used directly as made.

In general, to produce a resole for use in this invention, a substituted phenol product, as just described, is neutralized under aqueous liquid phase conditions as by the addition of base, and then from about 0.8 to 2.0 mols of formaldehyde per 1 mol of phenol (preferably from about 1.0 to 1.5 mols aldehyde per mol of phenol) is mixed with the substituted phenol product (now itself a starting material). Water may be added with the formaldehyde. Formalin is preferred as a source for formaldehyde. Also, a basic catalyst material, such as hexamethylenetetramine, ammonium hydroxide, triethylamine, sodium hydroxide, or mixtures thereof (or the like) is introduced into the reaction mixture. This basic catalyst can be used to neutralize the starting substituted phenol. Preferably, organic basic catalysts are used. The pH of this reaction mixture is maintained above 7.0 and preferably in the range from about 7.5 to 8.5. This reaction mixture is then heated to temperatures of from about 60° to 100° C. for a time sufficient to substantially react most of the aldehyde and produce a desired resole product. Times of from about 20 to 140 minutes are typical. Aqueous liquid phase preparation conditions are generally but not necessarily used.

It will be appreciated that the aldehyde to phenol ratios herein described have reference to the total amount of phenol present before a reaction, including the phenol which is substituted by the carbocyclic compound mixture, as described above.

To optimize electrical properties in resoles used in this invention, it is preferred to use as a basic catalyst, when reacting such substituted phenols with formaldehyde to make resole resins, one which is organic in character.

The resole product produced by reacting the substituted phenol with formaldehyde as described above is one composed of methylolated substituted phenol which has been methylolated by the aldehyde to a desired methylol content and optionally advanced (e.g., the molecular weight of the methylolated substituted phenol increased) as by heating as necessary or desirable to make a particular resole product. As those skilled in the art fully appreciate, the methylol content and the degree of advancement are controllable so that one can optimize such a resole resin for use in a particular application. For purposes of this invention, a phenol-formaldehyde resole resin or resole can be regarded as being the reaction product of the above-described substituted phenol mixture and formaldehyde under aqueous base catalyzed conditions as described herein which product can be thermoset by heat alone without the use of a curing catalyst.

In general, such a resole product as made is a brown-colored, unstable, multiphase aqueous emulsion whose viscosity depends, in any given instance, upon process and reactant variables but which usually ranges from a syrupy liquid to a semisolid state. Such a resole product usually separates from such aqueous phase as a brown-colored material whose viscosity varies from a syrup to a solid. This product, for use in making the laminates of this invention, is preferably formed into a varnish. To make a suitable varnish, such an emulsion is dehydrated preferably under heat and reduced pressure to a water content of from about 0.5 to 15 weight percent. After such dehydration, the resulting resin is dissolved in a relatively volatile, inert organic solvent medium which:

1. is substantially inert,
2. evaporate below about 150° C. at atmospheric pressures, and
3. is a mutual solvent for said resole resin and water (if present).

While the organic liquid used has properties as indicated above, it will be appreciated that such liquid can comprise mixtures of different organic liquids. Preferred liquids are lower alkanols (such as ethanol, and methanol) and lower alkanones (such as acetone or methyl ethyl ketone). The term "lower" refers to less than seven carbon atoms per molecule as used herein. Aromatic and aliphatic (including cycloaliphatic) hydrocarbons can also be employed as solvents for a given resin, including benzene, toluene, xylene, naphthalene, nonone, octane, petroleum fractions, etc. Preferably, the total water content of a varnish of the invention is below about 10 weight percent, and more preferably falls in the range of from about 0.5 to 5 weight percent.

Those skilled in the art will appreciate that care should preferably be taken when using this procedure to use an organic liquid system in which the phenolic resole resins are completely soluble as well as any water present. Adding, for example, a ketone or an ether-ester solvent like butyl cellosolve will generally improve the water tolerance (ability to dissolve water) of a solvent system.

These varnishes are characteristically dark-colored, one-phase, clear liquid solutions each having a viscosity ranging from about 5–5,000 centipoises. The exact viscosity of a given varnish depends upon many chemical process and product variables. For impregnating applications, viscosities of from about 50 to 500 centipoises are preferred.

The total solids content of a given varnish can be as high as about 85 weight percent or even higher and as low as about 20 weight percent or even lower, but preferred solids contents usually fall in the range of from about 25 to 65 weight percent.

The resole varnishes used in this invention thus comprise:
A. from about 20 to 75 weight percent of a dissolved mixture of a phenol-formaldehyde resole resin,
B. from about 0.5 to 15 weight percent of dissolved water,
C. the balance up to 100 weight percent of any given varnish being an organic liquid having properties as described above.

In general, an individual cellulosic substrate used in the laminates of the present invention is an integral performed sheetlike member composed substantially of cellulose fibers in a woven, nonwoven, or mixed structure. Typical thicknesses range from about 3 to 30 mils (under about 10 being preferred). Such members are well-known to the art and include paper and cloth broadly; they need have no special characteristics. The cellulosic fibers used in such a substrate member can be of natural or synthetic origin and the sheet member can be in a woven or nonwoven state. Typical well-known sources for cellulose fibers include wood, cotton, and the like. Typically, average cellulosic fibers used in substrates employed in this invention have length to width ratios of at least about 2:1, and preferably about 6:1, with maximum length to width ratios being variable.

The term "substantially" as used herein in reference to cellulose fibers has reference to the fact that a substrate comprises mainly cellulose fibers with not more than about 5 to 10 percent of any given cellulosic substrate being other components, such as nonfibrous fillers, diluents, and the like, or fibrous noncellulosic materials, such as those derived from organic sources (e.g., protein, synthetic organic polymeric fibers like polyesters, etc.) or inorganic sources (e.g., silicious fibers or metallic fibers). Such other components when and if present, characteristically have size ranges which are not greater in magnitude than the cellulosic fibers. Preferably such other components are under 1 weight percent of the total weight of a starting individual cellulosic substrate member.

Particularly when high-electrical properties are desired in a product laminate of the invention, the cellulosic substrate member should have a low-ash content. Ash contents under 1 weight percent (based on total cellulosic substrate member weight) are preferred, and those having ash contents under 0.5 weight percent are more preferred.

Before a liquid resole resin composition such as described above is used for impregnation of a preformed cellulosic substrate (such as described above), it is convenient to dilute such composition with an organic liquid (as described above) so that the total solids concentration of such resulting composition typically ranges from about 20 to 80 weight percent (as indicated), with solids contents of 40 to 60 percent being preferred. A primary reason for impregnating with such an organic liquid containing composition is to permit one to control the extent of impregnation and to impregnate a preformed cellulosic substrate such as paper without causing a deterioration in the wet strength thereof. Thus, by using an organic liquid system as described, the wet strength of the preformed cellulosic substrate material after impregnation and before drying to remove volatile liquid is maintained at convenient processing levels for subsequent drying, advancing, etc. by machines, etc.

In general, impregnation of a preformed substrate cellulosic member by such a liquid resole composition can be accomplished by any conventional means, including spraying, dipping, coating, or the like, after which it is convenient and preferred to dry the so-treated sheet to remove residual volatile components and thereby leave a desired impregnated sheetlike construction. In drying, care is used to prevent leaving excessive volatile material in the impregnated sheet. In general, a volatile level of less than about 8 percent by weight is desired.

For purpose of this invention, volatile level is conveniently determined by loss in weight after 10 minutes at 160° C. of a sample impregnated sheet. As indicated, a so-impregnated sheet member generally contains from about 5 to 40 weight percent of solids derived from said first composition.

To make a laminate of the invention from such an impregnated cellulosic substrate, the substrate is advanced to an extent such that it has a flow of from about 3 to 20 percent (preferably from about 5 to 15 percent). To so advance a sheet member to such a flow it is convenient to heat in air such an intermediate sheet to temperatures in the range of from about 30° to 180° C. for a time sufficient to advance same to the so-desired extent. It will be appreciated that such an advancement can be conveniently accomplished while residual volatile materials are being removed in a drying operation after impregnation, as indicated above.

Intermediate sheetlike members of the invention, whether advanced to the extent indicated or not, are generally at least about 4 mils thick and can be as thick as 20 mils, though thicknesses not more than about 10 mils are preferred.

The density of an individual impregnated sheetlike product is relatively unimportant since the laminate, as described below, is formed under heat and pressure conditions which generally solidify all components together into an integral, solid, nonporous, thermoset mass.

To make a laminate construction from an impregnated sheet member as described above, one forms at least one such sheet member (preferably advanced as described above) into a layered configuration which is at least two layers thick with adjoining layers being substantially in face-to-face engagement. As those skilled in the art will appreciate, an individual laminate construction of the invention can comprise a series of similar such intermediate members depending upon properties desired in the product laminate.

Such a layered configuration is then subjected to pressure in the range of from about 50 to 200 p.s.i. while maintaining temperatures in the range of from about 120° to 180° C. for a time sufficient to substantially completely thermoset the composite and thereby produce a desired laminate. Preferably the laminate is pressed at 140° to 160° C. at 500 to 1,500 p.s.i. for about 15 to 60 minutes. It is preferred but not necessary to use sheet members of this invention as the sole components for laminates of this invention.

EMBODIMENTS

The following additional examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples of liquid treating compositions suitable for use in making impregnated sheet members of this invention are as follows:

EXAMPLE A

100 Parts of phenol and 1 part of concentrated sulfuric acid are charged to a suitable reaction vessel and heated to 50° C. Then 70 parts of a carbocyclic compound mixture available commercially under the trade designation Monsanto Resin Oil, having a composition as given in table I are added to the starting mixture while keeping the temperature stable at 50° C. The temperature of the mixture is held at 50° C. after addition of such carbocyclic compound mixture for 1 hour after which 7.5 cc. of 28 percent $NH_4OH$ is added thereto to neutralize the acid catalyst. To the neutralized reaction mixture, 2 parts of triethylamine and 60 parts of 50 percent formalin (50—50 formaldehyde-water) are added and the reaction mixture is heated to a reflux at about 100° C. for 4 hours. Then the reaction mixture is cooled and volatile materials are removed under a vacuum of 28 inches of mercury until the temperature of the mixture rises to 80° C. Finally 50 parts of methanol and 10 parts of acetone are added to form a resin varnish treating solution having 71.4 percent solids (measured by heating 1½ grams of resin for 3 hours at 135° C.), an Ostwald viscosity of 4,582 centipoises at 25° C., a pH of 8.42 and a water content of 1.76 percent.

EXAMPLE B

100 Parts of phenol and 0.1 part of $BF_3$ are charged to a suitable reaction vessel and heated to 50° C. Then 30 parts of the carbocyclic compound mixture used in example A are added to the mixture gradually over a period of 30 minutes. The temperature of the mixture is held at 50° C. after addition of the carbocyclic compound mixture and then 7.5 parts of 28 percent $NH_4OH$ are added to neutralize the acid catalyst. Next 2 parts of triethylamine and 60 parts of 50 percent formalin are added to the neutralized mixture. Now the reaction mixture is heated to a reflux at 100° C. for 2 hours. The mixture is cooled and volatile material (mainly water) is removed under a vacuum of 28 inches of mercury until the temperature of the mixture rises to 80° C. Finally 50 parts of methanol are added to form a resin varnish treating solution having a solids content of 68.5 percent, a pH of 8.62, and a water content of 2 percent.

EXAMPLE C

100 Parts of phenol and 1 part of concentrated sulfuric acid are charged to a suitable reaction vessel. 50 parts of the carbocyclic compound mixture used in example A are added to the mixture gradually over a period of 30 minutes. The temperature of the reaction mixture rises due to an exothermic reaction. The temperature of the mixture is held at 75° C. for 30 minutes and then 7.5 parts of 28 percent $NH_4OH$ are added to neutralize the acid catalyst. Next add 2 parts of triethylamine and 60 parts of 50 percent formalin are added to the neutralized mixture. Now the mixture is heated to a reflux at 100° C. for 2 hours. The mixture is cooled and volatile material (mainly water) is removed under a vacuum of 28 inches of mercury until the temperature of the mixture rises to 80° C. Finally 60 parts of methanol are added to form a resin varnish treating solution having a solids content of 68.5 percent, a pH of 8.62, and a water content of 2 percent.

EXAMPLE D

100 Parts of phenol and 1 part of $BF_3$ are charged to a suitable reaction vessel and heated to 50° C. 70 Parts of the carbocyclic compound mixture used in example A are added to the mixture. The temperature of the mixture is held at 50° C. for 1 hour after addition of such carbocyclic compound mixture and then 5.0 parts of NaOH are added to neutralize the acid catalyst. Next 60 parts of 50 percent formalin are added thereto and the resulting mixture is heated to a reflux under vacuum at 66° C. Heating of the mixture is continued for 2 hours. Then, the mixture is cooled to remove volatile material (namely $H_2O$) under a vacuum of 28 inches of mercury to form a clear resin varnish heating solution having a solids content of 78 percent.

EXAMPLES E THROUGH V

The following examples are presented in tabular form for brevity. The process in all instances is as shown in example A except that the indicated variables are altered as shown in table III below in each respective instance.

This intermediate product in each example is reacted with formaldehyde in the manner as taught in example A to produce first an aqueous resole emulsion product which is then treated in the same manner as taught in example A to produce a resole varnish.

In table III, the numbers listed under "Type Catalyst" designate specific Friedel-Crafts catalysts as follows:
1—$H_2SO_4$
2—$BF_3$ diethyl ether
3—p-toluene sulfonic acid
4—$AlCl_3$ Similarly, the letters listed under "Type Carbocyclic Mixture" each designate a specific carbocyclic composition as follows:

|  | A | B | C | D |
|---|---|---|---|---|
| styrene | 1-2 | 10.1 | 1 | 10 |
| alpha-methyl styrene | 1-3 | 2.2 | 2 | 2 |
| beta-methyl styrene | 1-3 | 2.1 | 2 | 2 |
| vinyl toluene | 14-21 | 10.5 | 10 | 25 |
| $C_2$ alkyl styrene | 4-7 | 5.8 | 4 | 4 |
| divinyl benzene | 1-2 | 1.6 | 1 | 1 |
| indene | 15-22 | 12.7 | 10 | 25 |
| methyl indene | 4-7 | 7.6 | 5 | 5 |
| dicyclopentadiene | 12-18 | 1.1 | 5 | 25 |
| methylcyclopentadiene | 4-6 | 2.1 | 1 | 1 |
| inert diluent | 25-35 | 44.2 | 59 | 0 |

The columns designated, respectively, "Phenol," "Amount Carbocyclic Compound Mixture," and "Amount Catalyst" are in terms of parts by weight.

TABLE III

| Ex. No. | Phenol | Catalyst Type | Catalyst Amt. | Carbocyclic compound mixture Type | Carbocyclic compound mixture Amt. | Temperature, °C. | Post reaction time, min. |
|---|---|---|---|---|---|---|---|
| E | 100 | 1 | 1.0 | A | 50 | 50 | 15 |
| F | 100 | 2 | 0.1 | A | 30 | 50 | 15 |
| G | 100 | 1 | 1.0 | A | 50 | 75 | 15 |
| H | 100 | 2 | 1.0 | A | 70 | 50 | 15 |
| I | 100 | 3 | 0.5 | A | 30 | 65 | 15 |
| J | 100 | 1 | 0.3 | A | 70 | 100 | 15 |
| K | 100 | 1 | 1.0 | A | 30 | 100 | 15 |
| L | 100 | 1 | 0.3 | A | 80 | 75 | 15 |
| M | 100 | 1 | 0.3 | B | 90 | 75 | 45 |
| N | 100 | 1 | 0.3 | B | 30 | 75 | 15 |
| O | 100 | 4 | 1.0 | B | 50 | 100 | 30 |
| P | 100 | 2 | 0.5 | B | 70 | 50 | 15 |
| Q | 100 | 1 | 0.3 | A | 30 | 75 | 15 |
| R | 100 | 1 | 0.3 | A | 70 | 75 | 15 |
| S | 100 | 1 | 0.3 | C | 50 | 75 | 15 |
| T | 100 | 1 | 0.3 | D | 50 | 75 | 60 |
| U | 100 | 1 | 0.3 | C | 125 | 85 | 15 |
| V | 100 | 1 | 0.3 | C | 30 | 40 | 240 |

EXAMPLE W

100 Parts of phenol and 0.3 part of concentrated sulfuric acid are charged to a suitable reaction vessel and heated to 70° C. 70 Parts of the carbocyclic compound mixture used in example A are added to the mixture over a period of 45 minutes while keeping the temperature at 70°–80° C. The temperature of the mixture is held at 70° to 80° C. after addition of the carbocyclic compound mixture for 15 minutes. Then 3 parts of hexamethylene tetramine, 2 parts of triethylamine and 60 parts of 50 percent formalin (50—50 formaldehyde-water) are added to the reaction mixture. The reaction mixture is now heated to atmospheric reflux at 100° C. and refluxed for 2.5 hours. Then the mixture is cooled and volatile material is removed under a vacuum of 25.5 inches of mercury until the temperature of the mixture reaches 60° C. Finally, 87 parts of methanol are added to form a resin treating solution, having 59.3 percent solids (measured by heating 1.5 grams of resin for 3 hours at 135° C.) and an Ostwald viscosity of 137 centipoises at 25° C.

EXAMPLE X

100 Parts of phenol and 0.3 parts concentrated sulfuric acid are charged to a suitable reaction vessel and heated to 70° C. 70 Parts of carbocyclic compound mixture used in example A is added to the mixture over a period of 45 minutes while keeping the temperature at 70° to 80° C. after addition of the carbocyclic compound mixture for 15 minutes; then 3 parts of hexamethylenetetraethylamine, 2 parts of triethylamine and 60 parts of 50 percent formalin are added. The reaction mixture is heated to atmospheric reflux at 100° C. for 1.5 hours. The mixture is cooled and volatile material is removed under a vacuum of 25½ inches of mercury until the temperature of the mixture reaches 60° C. Finally a 92/8 mixture of ethanol/toluene is added to form a resin treating solution having 66 percent solids.

Examples of impregnated cellulosic sheet members used in this invention are as follows:

EXAMPLES 1–30

Samples of preformed cellulosic substrate types are chosen as follows:
Type 1: Nonwoven cotton linters paper, about 10 mils thick.
Type 2: Nonwoven unbleached kraft paper about 7 mils thick.
Type 3: Nonwoven $\alpha$-cellulose paper about 10 mils thick.
Type 4: Nonwoven bleached kraft paper about 15 mils thick.
Type 5: Woven cotton duck about 8 oz. weight.
Type 6: Woven linen cloth about 4 oz. weight.

All types have an ash content less than about 0.9 weight percent.

The impregnation procedure for impregnating each above substrate is as follows: Preformed cellulosic sheets are passed through the impregnating solution diluted to the approximate solids content, drawn through the nip region between a pair of squeeze rolls to remove excess resin and hung in an oven to dry.

Details concerning the impregnated cellulose sheets made from the above substrate types and using the foregoing impregnation procedure are summarized in table IV below:

TABLE IV

| Example No. | Treating solution Ex. No. | Treating solution Solids content | Preformed cellulose substrate type | Total resin content |
|---|---|---|---|---|
| 1 | W | 59.3 | 1 | 58 |
| 2 | W | 59.3 | 2 | 61 |
| 3 | W | 59.3 | 3 | 61 |
| 4 | W | 59.3 | 4 | 62 |
| 5 | Q | 59.3 | 5 | 56 |
| 6 | Q | 59.3 | 6 | 55 |
| 7 | Q | 59 | 1 | 58 |
| 8 | Q | 40 | 1 | 40 |
| 9 | L | 60 | 1 | 61 |
| 10 | I | 60 | 5 | 52 |
| 11 | K | 60 | 1 | 59 |
| 12 | K | 50 | 1 | 51 |
| 13 | M | 60 | 1 | 58 |
| 14 | U | 60 | 1 | 61 |
| 15 | V | 50 | 1 | 49 |
| 16 | A | 60 | 1 | 62 |
| 17 | B | 60 | 1 | 61 |
| 18 | C | 60 | 1 | 58 |
| 19 | D | 60 | 1 | 59 |
| 20 | E | 60 | 1 | 61 |
| 21 | F | 60 | 1 | 59 |
| 22 | G | 60 | 1 | 59 |
| 23 | H | 60 | 1 | 60 |
| 24 | J | 60 | 1 | 60 |
| 25 | N | 60 | 1 | 60 |
| 26 | O | 60 | 1 | 58 |
| 27 | P | 60 | 1 | 59 |
| 28 | R | 60 | 1 | 59 |
| 29 | S | 60 | 1 | 60 |
| 30 | T | 60 | 1 | 60 |

EXAMPLES 31–60

Examples of the laminates of this invention are as follows:
Preformed cellulosic substrates impregnated as taught in examples 1–30 are formed into laminates by stacking the preformed sheets into a deck and then subjecting the resulting deck to appropriate pressures and temperatures for times sufficient to substantially completely thermoset the resin and form an integral laminate composite product.

Details concerning the manufacture of laminates so-made are summarized in table V below:

TABLE V

| Example No. | Preformed cellulose sheet Ex. No. | Number of sheets | Laminate forming conditions | | |
|---|---|---|---|---|---|
| | | | Pressure, p.s.i. | Temp., °C. | Time, min. |
| 31 | 1 | 8 | 1,000 | 160 | 30 |
| 32 | 2 | 9 | 1,000 | 150 | 30 |
| 33 | 3 | 8 | 1,000 | 160 | 30 |
| 34 | 4 | 5 | 1,000 | 160 | 30 |
| 35 | 5 | 4 | 1,000 | 140 | 45 |
| 36 | 6 | 6 | 1,000 | 140 | 45 |
| 37 | 7 | 8 | 1,000 | 160 | 30 |
| 38 | 8 | 12 | 1,000 | 160 | 30 |
| 39 | 9 | 8 | 1,000 | 160 | 30 |
| 40 | 10 | 8 | 1,000 | 160 | 30 |
| 41 | 11 | 8 | 1,000 | 160 | 30 |
| 42 | 12 | 8 | 1,000 | 160 | 30 |
| 43 | 13 | 8 | 1,000 | 160 | 30 |
| 44 | 14 | 8 | 1,000 | 160 | 30 |
| 45 | 15 | 10 | 1,000 | 160 | 30 |
| 46 | 16 | 8 | 1,000 | 160 | 30 |
| 47 | 17 | 8 | 1,000 | 160 | 30 |
| 48 | 18 | 8 | 1,000 | 160 | 30 |
| 49 | 19 | 8 | 1,000 | 160 | 30 |
| 50 | 20 | 8 | 1,000 | 160 | 30 |
| 51 | 21 | 8 | 1,000 | 160 | 30 |
| 52 | 22 | 8 | 1,000 | 160 | 30 |
| 53 | 23 | 8 | 1,000 | 160 | 30 |
| 54 | 24 | 8 | 1,000 | 160 | 30 |
| 55 | 25 | 8 | 1,000 | 160 | 30 |
| 56 | 26 | 8 | 1,000 | 160 | 30 |
| 57 | 27 | 8 | 1,000 | 160 | 30 |
| 58 | 28 | 8 | 1,000 | 160 | 30 |
| 59 | 29 | 8 | 1,000 | 160 | 30 |
| 60 | 30 | 8 | 1,000 | 160 | 30 |

These product laminates all display good physical strength properties, water absorption properties (using ASTM Test No. D-229), dielectric constants (using ASTM Test No. D-150), dissipation factors (using ASTM Test No. D-150), solvent resistance, and heat resistance.

What is claimed is:

1. A laminate comprising:
   A. a plurality of integral cellulosic substrate members in sheetlike form arranged face to face in a layered configuration,
   B. each said substrate member being impregnated with a thermoset substituted phenol-formaldehyde resole resin,
   C. each said member being bonded substantially in face-to-face engagement to its adjacent member by such thermoset resin,
   D. said resin comprising from about 30 to 70 parts by weight of said laminate with the balance up to 100 weight percent of any given said laminate being substantially said members,
   E. said resole resin being characterized by:
      1. having a formaldehyde to phenol mol ratio of from about 0.8 to 2.0,
      2. being produced by reacting under aqueous liquid phase conditions formaldehyde and a substituted phenol mixture in the presence of a basic catalyst,
      3. being substantially insoluble in water but having an acetone solubility such that a 55 weight percent solution thereof in acetone can be prepared, and
      4. having a free formaldehyde content which is less than about 5 weight percent,
   F. said substituted phenol mixture having been prepared by reacting phenol under Friedel-Crafts conditions with from about 10 to 80 parts by weight for each 100 parts by weight of said phenol of a mixture of carbocyclic compounds,
   G. said mixture of carbocyclic compounds comprising (on a 100 weight percent basis when in a form substantially free of other materials);
      1. from about 10 through 40 weight percent (total mixture basis) of compounds each molecule of which has:
         a. the indene nucleus,
         b. from nine through 13 carbon atoms,
         c. as nuclear substituents from zero through four methyl groups,
      2. from about 5 through 70 weight percent (total mixture basis) of compounds each molecule of which has:
         a. the dicyclopentadiene nucleus,
         b. from 10 through 13 carbon atoms,
         c. as nuclear substituents from zero through three methyl groups,
      3. from about 15 through 65 weight percent (total mixture basis) of compounds each molecule of which has:
         a. a phenyl group substituted by a vinylidene group,
         b. from eight through 13 carbon atoms,
         c. as substituents from zero through three groups selected from the class consisting of methyl and ethyl,
      4. from about 0 through 5 weight percent divinyl benzene,
      5. provided that the sum total of all said compound in any given such mixture of carbocyclic compounds is always 100 weight percent.

2. The laminate of claim 1 wherein said carbocyclic compound mixture comprises:
   A. from about 20 through 40 weight percent (total mixture basis) of compounds each molecule of which has:
      1. the indene nucleus
      2. from nine through 13 carbon atoms
      3. as nuclear substituents from zero through four methyl groups,
   B. from about 15 through 30 weight percent (total mixture basis) of compounds each molecule of which has:
      1. the dicyclopentadiene nucleus,
      2. from 10 through 13 carbon atoms
      3. as nuclear substituents from zero through three methyl groups,
   C. from about 30 through 65 weight percent (total mixture basis) of compounds each molecule of which has:
      1. a phenyl group substituted by a vinylidene group,
      2. from eight through 13 carbon atoms,
      3. as substituents from zero through three groups selected from the class consisting of methyl and ethyl
   D. from about 0 through 5 weight percent divinyl benzene,
   E. provided that the sum total of all such compounds in any given said mixture of carbocyclic compounds is always 100 weight percent.

3. The laminate of claim 1 wherein each substrate member has an ash content under 0.5 weight percent.

4. A laminate of claim 1 wherein each substrate member ranges from about 3 to 30 mils.

5. A laminate of claim 4 wherein each substrate member is under 10 mils in thickness.

* * * * *